United States Patent
Uhlhorn

(10) Patent No.: US 7,245,800 B1
(45) Date of Patent: Jul. 17, 2007

(54) FIBER OPTIC INTERCONNECT WITH VISIBLE LASER INDICATOR AND FAULT DETECTOR

(75) Inventor: Brian L. Uhlhorn, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 73 days.

(21) Appl. No.: 10/936,463

(22) Filed: Sep. 8, 2004

(51) Int. Cl.
*G02B 6/28* (2006.01)

(52) U.S. Cl. .......................................... 385/24; 385/15

(58) Field of Classification Search ................... 385/24
See application file for complete search history.

(56) References Cited

U.S. PATENT DOCUMENTS

| 654,798 | A | 7/1900 | Leary |
|---|---|---|---|
| 4,257,033 | A | 3/1981 | Ota et al. |
| 4,320,968 | A | 3/1982 | Wakabayashi et al. |
| 5,510,917 | A | 4/1996 | Corke et al. |
| 5,757,526 | A | 5/1998 | Shiragaki et al. |
| 5,781,318 | A | 7/1998 | Tremblay |
| 5,917,479 | A | 6/1999 | Haapakoski |
| 6,005,694 | A | 12/1999 | Liu |
| 6,178,025 | B1 | 1/2001 | Hardcastle et al. |
| 6,285,475 | B1 | 9/2001 | Fee |
| 6,317,535 | B1 | 11/2001 | Jennings et al. |
| 6,381,211 | B1 | 4/2002 | Lysejko et al. |
| 6,522,434 | B1 | 2/2003 | Jennings et al. |
| 6,587,974 | B1 | 7/2003 | Majd et al. |
| 6,623,185 | B1 | 9/2003 | Peragine |
| 6,798,523 | B2 | 9/2004 | Lange et al. |
| 2003/0103211 | A1 | 6/2003 | Lange et al. |
| 2004/0004709 | A1 | 1/2004 | Pitchforth, Jr. |
| 2004/0208503 | A1 | 10/2004 | Shieh |
| 2005/0157978 | A1* | 7/2005 | Miyazaki ..................... 385/24 |

FOREIGN PATENT DOCUMENTS

JP   08201224   * 9/1996

OTHER PUBLICATIONS

Datacom, Ra Series Fiber Optic Test Instruments, Brochure, Jan. 19, 1999, 6 pages.

(Continued)

*Primary Examiner*—Jennifer Doan
(74) *Attorney, Agent, or Firm*—Brooks & Cameron, PLLC

(57) ABSTRACT

An optical transmission system for transmitting optical data comprises an optical transmitter, an optical receiver and a transmission medium capable of providing a visual indication of transmission status as well as the location of potential faults within the transmission medium. The optical transmitter supplies a first nonvisible light source for transmitting optical data and a second visible light source providing a visual indication of transmitter operation and possible faults. The first nonvisible light source and the second visible light source are transmitted across the transmission medium whereby they are received by the optical receiver. The optical receiver includes a filter member for removing the visible light source prior to converting the second visible light source into an electrical signal.

22 Claims, 4 Drawing Sheets

OTHER PUBLICATIONS

Kingfisher International, Optical Cable Fault Location, www.kingfisher.com.au/appnotes/A11.htm, Nov. 20, 2003, 7 pages.

APL, Built-in-test (BIT) for Fiber Optic Sensors, webpages, Nov. 21, 2003, 2 pages.

Kingfisher International, KI 6351 Visible Pen, www.kingfisher.com.au, 2 pages.

Kingfisher International, Fiber Optic Fault Finders & Continuity Testers, www.kingfisher.com.au/VisibleFaultFinder.htm, Nov. 20, 2003, 2 pages.

* cited by examiner

FIBER OPTIC INTERCONNECT WITH VISIBLE LASER INDICATOR AND FAULT DETECTOR

FIELD OF THE INVENTION

The present invention relates generally to fiber optics. More specifically, the present invention is directed to a fiber optic transmitter having an optical data transmitter combined with a visible light transmitter so as to indicate the transmission of optical data and allow for troubleshooting without additional test instruments or the need to disassemble the optical circuit.

BACKGROUND OF THE INVENTION

The development and implementation of fiber optics has radically changed the world we live in. Using fiber optics, data, voice and video information can be digitized, transmitted and received almost instantly throughout the world. With the development of fiber optics, transmission speeds are typically limited only by the speed and capacity of the sending and receiving means. At the same time, the optical fiber used in fiber optic systems is more reliable and more secure as compared to traditional copper transmission lines.

A basic fiber optic system comprises three main components: (1) a transmitter; (2) a transmission medium; and (3) a receiver. A fiber optic transmitter converts an electrical signal to a light signal, which is subsequently emitted from the transmitter. The light signal is typically within the nonvisible spectrum such that there is no visible indication to anyone proximate the fiber optic system that data is being transmitted. The transmission medium carries the light signal from the transmitter to the receiver. The receiver converts the light signal into an electrical signal. While the concept of a basic fiber optic system is easy to envision, actual installation of a fiber optic system can be a complex and expensive process.

While the use of optical fiber has many advantages, the costs associated with installing such optical fiber systems are significantly higher than traditional copper transmission systems. This is due to the added expense of manufacturing the fiber optics as well as the installation complexities involved with installing a fiber optic system. Thus, alignment and connection of the fiber optic cabling must be successfully accomplished throughout the entire fiber optic system.

After installing a fiber optic system, a variety of fault conditions may develop whereby optical data transmission is reduced or prevented. For example, the optical fiber may be damaged, bent, cut or crimped. As the optical data is typically transmitted via a nonvisible wavelength, the location of the fault conditions is not readily apparent. Generally, the transmitter must be removed from the fiber optic system and replaced with a fault detector capable of generating a light source within the visible spectrum. Once the fault detector is installed, the location of the fault can be identified by a "bright spot" in the optical fiber.

While a visible fault detector can be successfully employed to locate faults in optical fibers, it would be advantageous to avoid the time and expense of disassembling the optical fiber system to install the fault detector. Furthermore, it would be advantageous to employ a visible element within the optical fiber system to indicate when optical data is being transmitted.

SUMMARY OF THE INVENTION

The present invention addresses both of the aforementioned needs. The present invention may comprise an optical laser transmitter that provides a visual indication of data transmission as well as simultaneously indicating faults within the optical fiber. The present invention comprises an optical transmitter capable of simultaneously transmitting a first nonvisible light source for transmitting optical data and a second visible light source providing a visual indication of transmitter operation and possible faults. Thus, the optical transmission system does not have to be disassembled to locate faults. The present invention may also comprise an optical laser receiver including a filtering member for removing the visible light source prior to converting the optical data into an electrical signal.

In a first embodiment, the present invention may comprise a fiber optic diagnostic transmission apparatus for providing an indication of a fault location along a fiber optic path. The fiber optic diagnostic transmission apparatus may include a transmitter having a first light source and a second light source, wherein the first light source emits a nonvisible wavelength for data transmission and the second light source emits a visible wavelength for fault detection. The first light source is preferably a laser, such as a Vertical Cavity Surface Emitting Laser, a Fabry-Perot laser or a Distributed Feedback Laser. The second light source may be a Light Emitting Diode (LED) that transmits constantly or intermittently. The transmitter integrates the first signal and the second signal by an additive filter. The fiber optic diagnostic transmission apparatus may also include a receiver having a drop filter and a photodiode, wherein the drop filter strips the visible troubleshooting signal from the data signal prior to reception by the photodiode. The drop filter may be a reflective thin film filter, an absorptive thin film filter or a wavelength dependent beam split filter. The photodiode then converts the data signal from a nonvisible wavelength to an electrical signal.

DETAILED DESCRIPTION OF THE DRAWINGS

Figure 1:
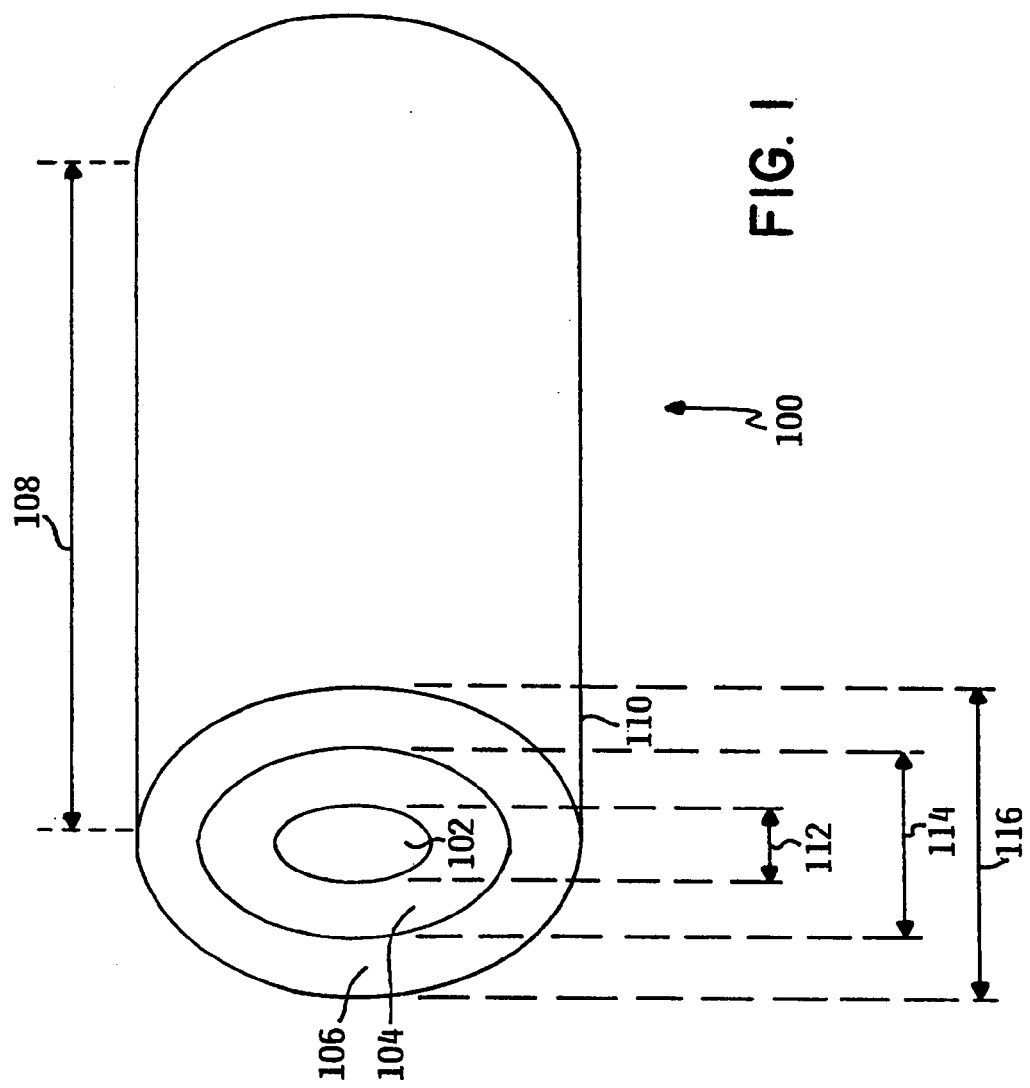
FIG. 1 is a perspective view of a length of optical fiber.

As depicted in FIG. 1, a length of optical fiber 100 comprises an internal glass core 102, a layer of glass cladding 104, and exterior jacket 106. Optical fiber 100 is available in two configurations, either a singlemode fiber or a multimode fiber. Singlemode fiber is used primarily in long distance applications due to its advantageous transmission characteristics, i.e. pulse dispersion characteristics, while multimode fiber is less expensive to manufacture and is used for shorter distances, for example where fiber length 108 of optical fiber 100 is less than 3 km. Exterior jacket 106 is generally available in two configurations, either a loose tube jacket coating or a tight tube jacket coating depending on the installation characteristics.

For purposes of describing a preferred embodiment, optical fiber 100 will be described as having a singlemode fiber configuration 110 though the present invention can be practiced with a multimode fiber configuration as well. In the singlemode fiber configuration 110, the internal glass core 102 has a core diameter 112, a cladding diameter 114 and a jacket diameter 116. In some embodiments, core diameter 110 can range from 62.5–100 microns while the cladding diameter 112 can be 125–140 microns.

Figure 2:
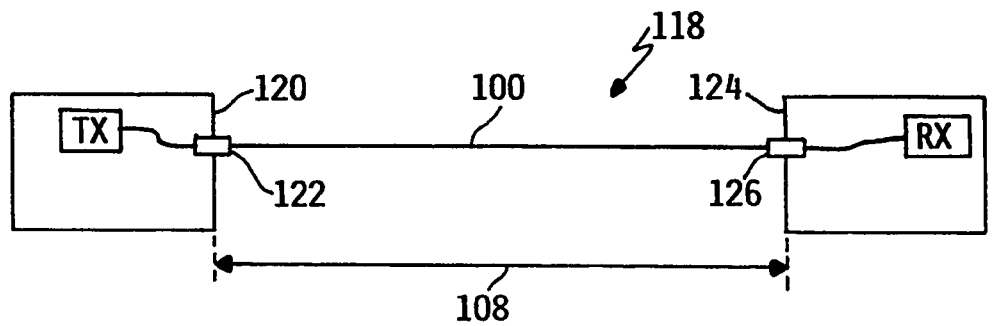
FIG. 2 is a schematic of a fiber optic installation.

A typical fiber optic installation 118 is depicted in FIG. 2. Generally, fiber optic installation 118 comprises a length of optical fiber 100 with an optical transmitter (TX) 120 at a transmitting end 122 and an optical receiver (RX) 124 at a receiving end 126. Optical transmitter 120 includes a light source for emitting light of a specific wavelength, for example 850, 1300 or 1555 nanometers. These lights sources are not visible to the human eye such that an individual cannot determine if the fiber optic installation 118 is active and transmitting optical information without the use of an optical power meter.

The light source is configured as either a Light Emitting Diode (LED) or a laser. LED's tend to be inexpensive but have low output power resulting in limited range, poor linearity and broad spectral output and are used for low speed applications. Lasers such as a Vertical Cavity Surface Emitting Laser (VCSEL), a Fabry-Perot laser or a Distributed Feedback (DFB) laser tend to be more expensive than a LED. Lasers are typically used in high end, fiber optic installations where characteristics such as high output power, narrow spectral output and high transmission speeds are desirable. The light source is typically modulated, for example on and off, to correspond to a digital data stream supplied to the optical transmitter 120. Optical receiver 124 includes a photodiode for sensing light output through the optical fiber 100 and signal conditioning circuitry that converts the light output into an electrical signal. The electrical signal is subsequently demodulated and converted into the original digital signal input to the optical transmitter 120.

Figure 3:
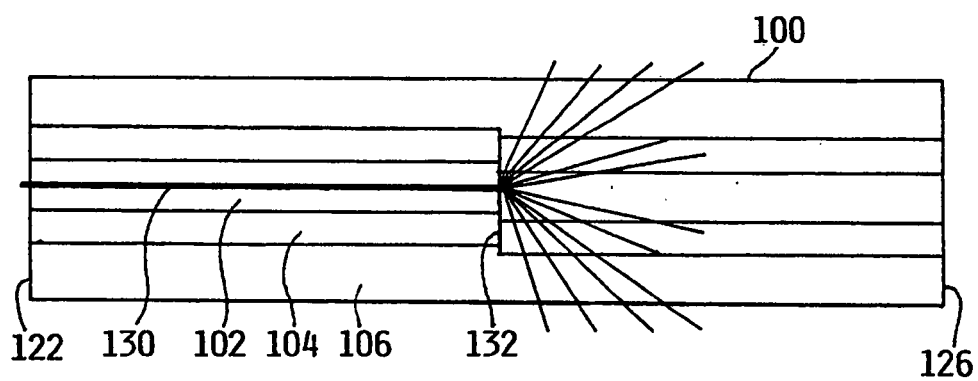
FIG. 3 is a section view of a length of damaged optical fiber.

The effectiveness of the fiber optic installation 118 requires proper alignment of the optical transmitter 120, the optical fiber 100 and the optical receiver 124. A variety of fault conditions can affect the performance of fiber optic installation 118. For example, FIG. 3 depicts a cracked or broken fiber optic cable 128 in which the internal glass core 102 and the glass cladding 104 has become misaligned. As an optical signal 130 is transmitted from the transmitting end 122 to the receiving end 126, the optical signal 130 encounters a break 132 causing the optical signal 130 to scatter. The scattered signal 131 never reaches the optical receiver 124.

Figure 4:
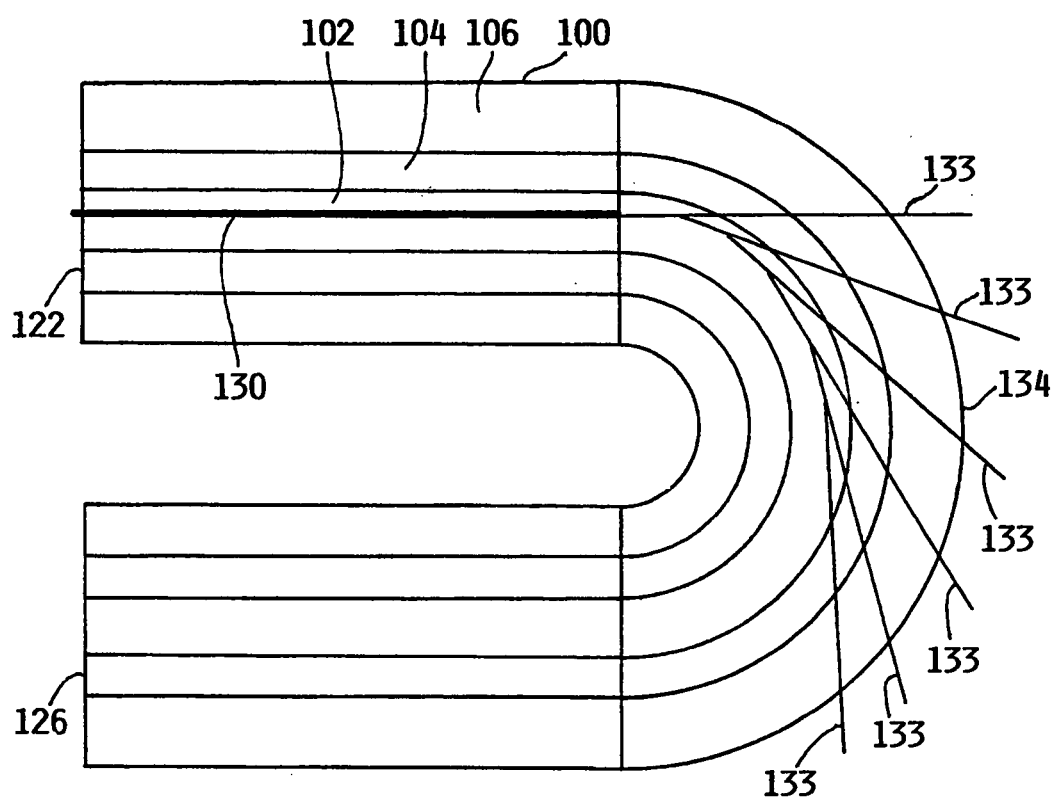
FIG. 4 is a section view of a length of bent optical fiber.

FIG. 4 depicts a transmission fault wherein the optical fiber 100 includes an extreme bend 134 at a location between the transmitting end 122 and the receiving end 126. As depicted, the optical signal 130 cannot track with the extreme bend 134. The optical signal 130 loses the signal elements 133 that due to angle of incidence cannot be redirected. In an extreme bend 134 none of the optical signal 130 ever reaches the optical receiver 124.

Figure 5:
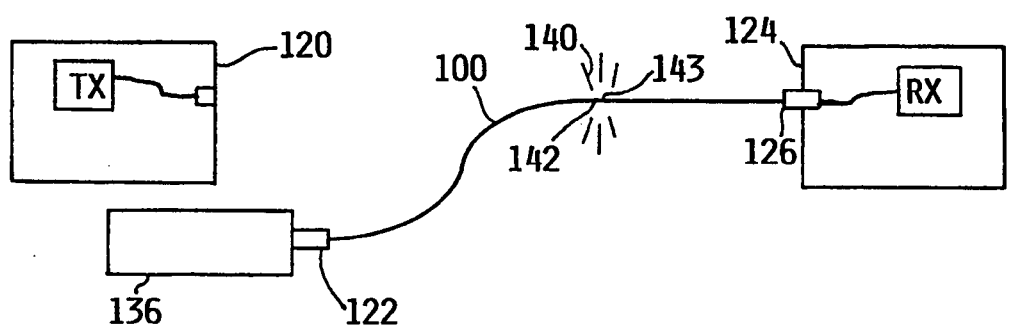
FIG. 5 is a schematic view of a prior art optical fault detection assembly.

When a fault such as those depicted in FIGS. 3 and 4 is detected, one method for identifying the fault location is to remove the optical transmitter 120 from the fiber optic installation 118 and replace it with a visual fault detector 136 as shown in FIG. 5. The visual fault detector 136 includes a detector light source such as an LED or laser. The detector light source generates a detector light output 140 which must be visible to the human eye. When the detector light output 140 encounters a fault 142, such as break 132 or extreme bend 134, a bright spot 143 is visible through the exterior jacket 106 at the fault 142. While the visual fault detector 136 can be used successfully, it suffers from the drawbacks associated with the time and expense required to disassemble the fiber optic installation 118.

Figure 6:
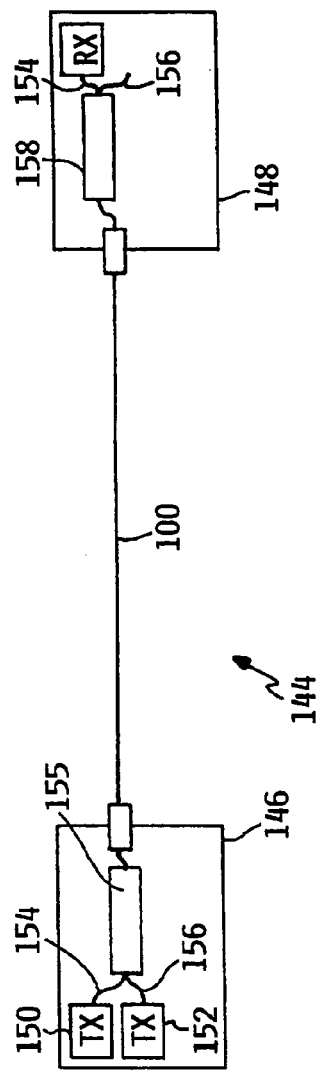
FIG. 6 is a schematic view of an improved fiber optic installation of the current invention.

An improved fiber optic installation 144 including the present invention is illustrated in FIG. 6. The improved fiber optic installation 144 includes a dual-function optical transmitter 146, optical fiber 100 and a dual-function optical receiver 148. The dual-function optical transmitter 146 comprises a first optical source 150 and a second optical source 152. First optical source 150 transmits a standard non-visible optical signal 154 corresponding to the digital signal input to the dual-function optical transmitter 146 while the second optical source 152 simultaneously transmits a visible optical signal 156. Non-visible optical signal 154 and visible optical signal 156 are passed though an additive filter 155 so that the non-visible optical signal 154 and the visible optical signal 156 are simultaneously transmitted the length of optical fiber 100.

The second optical source 152 can be configured to emit the visible optical signal 156 in a variety of ways for example, either intermittently or continuously when the first optical source 150 is transmitting the non-visible optical signal 154 or at times when first optical source 150 is dormant or not transmitting. By transmitting the visible optical signal 156 intermittently, the overall power consumption of the dual-function optical transmitter 146 can be reduced.

The dual-function optical receiver 148 includes a filter 158 adapted to remove the visible optical signal 156 prior to converting the non-visible optical signal 154 to an electrical signal. Filter 158 can comprise a reflective or absorptive thin film filter, a wavelength dependent beam split or other suitable optical filtering component. The non-visible optical signal 154 proceeds uninterrupted through the filter 158 whereby the non-visible optical signal 154 is converted into an electrical signal and demodulated to form the digital signal originally input into the dual-function optical transmitter 146.

Figure 7:
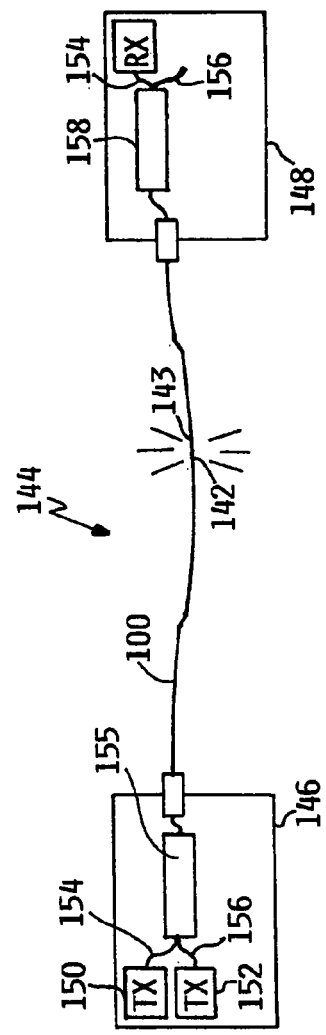
FIG. 7 is a schematic view of the improved fiber optic installation of FIG. 6 indicating a fault location.

As shown in FIG. 7, the improved fiber optic installation 144 quickly and clearly indicates the location of the fault 142 by displaying the bright spot 143 without the use of the visual fault detector 136 and without disassembling the improved fiber optic installation 144. In addition, the dual-function optical receiver 148 can include a display means whereby an individual can note the presence of visible optical signal 156 such that the individual would be aware of the transmission status of the non-visible optical signal 154 without requiring the use of an optical power meter.

Although various embodiments of the present invention have been disclosed here for purposes of illustration, it should be understood that a variety of changes, modifications and substitutions may be incorporated without departing from either the spirit or scope of the present invention

The invention claimed is:

1. A fiber optic diagnostic transmission apparatus for providing an indication of a fault location along a fiber optic path, said apparatus comprising:
    a transmitter having a first light source and a second light source, wherein the first light source emits a first signal at a nonvisible wavelength for data transmission and the second light source emits a second signal at a visible wavelength for fault detection, said transmitter integrating the first signal and the second signal to transmit a combined signal over the fiber optic path; and a receiver having a drop filter and a photodiode, wherein the drop filter discriminates the second signal from the first signal prior to reception of the first signal by the photodiode, said photodiode converting the first signal from a nonvisible wavelength to an electrical signal.

2. The fiber optic diagnostic transmission apparatus of claim 1 wherein the transmitter integrates the first signal and the second signal by an additive filter.

3. The fiber optic diagnostic transmission apparatus of claim 1 wherein the first light source is a laser.

4. The fiber optic diagnostic transmission apparatus of claim 3 wherein the laser is selected from the group consisting essentially of a Vertical Cavity Surface Emitting Laser, a Fabry-Perot laser and a Distributed Feedback Laser.

5. The fiber optic diagnostic transmission apparatus of claim 1 wherein the second light source is a Light Emitting Diode.

6. The fiber optic diagnostic transmission apparatus of claim 1 wherein the second light source is transmitted intermittently.

7. The fiber optic diagnostic transmission apparatus of claim 1 wherein the fiber optic path is a multimode fiber or a singlemode fiber.

8. The fiber optic diagnostic transmission apparatus of claim 1 wherein the first signal has a wavelength of 850, 1300 or 1555 nanometers.

9. The fiber optic diagnostic transmission apparatus of claim 1 wherein the drop filter is a reflective thin film filter, an absorptive thin film filter or a wavelength dependent beam split filter.

10. A method for visually identifying the status of a fiber optic transmission system comprising:

transmitting a first optical signal from an optical transmitter across a length of fiber optic wire to an optical receiver;

transmitting a second optical signal from the optical transmitter across the fiber optic wire to the optical receiver, the second optical signal having a visible wavelength and being transmitted with the first optical signal;

evaluating whether the first optical signal is received by the optical receiver; and locating a visible indicator along the fiber optic wire upon detecting that the first optical signal has not reached the optical receiver.

11. The method of claim 10 further comprising:

removing the second optical signal prior to converting the first optical signal to an electrical signal, the second optical signal being removed by a filter integral to the optical receiver.

12. The method of claim 11 wherein the filter is a reflective thin film filter, an absorptive thin film filter or a wavelength dependent beam split filter.

13. The method of claim 10 wherein the first optical signal and the second optical signal are integrated by an additive filter.

14. The method of claim 10 wherein the second optical signal is generated by a Light Emitting Diode integral to the optical transmitter.

15. The method of claim 10 wherein the first optical signal is generated by a laser integral to the optical transmitter.

16. The method of claim 15 wherein the laser is a Vertical Cavity Surface Emitting Laser, a Fabry-Perot laser or a Distributed Feedback Laser.

17. The method of claim 10 wherein the second optical signal is transmitted intermittently.

18. The method of claim 10 wherein the length of fiber optic wire is a singlemode fiber or a multimode fiber.

19. The method of claim 10 wherein the first optical signal has a nonvisible wavelength of 850, 1300 or 1555 nanometers.

20. The method of claim 10 wherein the visible indicator is an illuminated section of the fiber optic wire.

21. A fiber optic transmission apparatus comprising:

means for transmitting an integrated signal over a fiber optic wire, said means including an optical transmitter wherein said integrated signal includes a first optical signal and a second optical signal, the first optical signal being a data signal and the second optical signal being a visible signal;

means for filtering the integrated signal by an optical receiver, said optical receiver discriminating the second optical signal from the first optical signal;

means for converting the first optical signal to an electronic signal, wherein an absence of a first optical signal indicates a nonfunctional transmission condition between the optical transmitter and the optical receiver; and means for detecting a fault location by creating an indicator due to a scattering of the second optical signal approximate the fault location.

22. The fiber optic transmission apparatus of claim 21 wherein the indicator is an illuminated section of the fiber optic wire.

* * * * *